United States Patent Office 3,131,139
Patented Apr. 28, 1964

3,131,139
RADIATION INDUCED VULCANIZATION
OF RUBBER LATEX
Robert B. Mesrobian, Hinsdale, Ill., and David S.
Ballantine, Blue Point, and Donald J. Metz, Stony
Brook, N.Y., assignors to the United States of
America as represented by the United States
Atomic Energy Commission
No Drawing. Original application Aug. 28, 1959, Ser.
No. 836,835. Divided and this application Jan. 31,
1963, Ser. No. 263,372
2 Claims. (Cl. 204—160)

This invention relates to new graft copolymers. More particularly, it relates to the preparation of radiation-induced graft copolymers by the reaction of a polymerizable ethenically unsaturated monomer with polymers of different composition. More particularly, it relates to the technique of radiation grafting of natural or synthetic rubber in combination with a vinyl monomer, thereby varying the properties of these elastomers.

This application is a division of now abandoned application Serial Number 836,835, filed on August 28, 1959.

To make this invention clear, a brief clarification of terms will be helpful.

By the term graft copolymer, we mean a copolymer, the molecules of which consist of two or more polymeric portions, of different composition, chemically united together.

It is known that a quantity of monomer A in bulk or in solution if exposed to high energy radiation, such as gamma rays, will form a linear polymer with occasional branching. The product may have the following form:

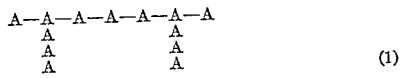  (1)

This is called a homopolymer.

If a mixture of two monomers A and B is exposed to high energy radiation such as gamma rays, a polymer is formed which will have monomeric units combined in irregular sequence. Such material, which may be linear or branched, is called a copolymer and may have the following general structure:

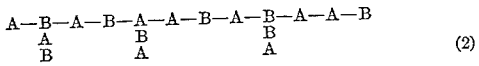  (2)

Both copolymers of the type described above have been produced by irradiating monomers and mixtures of monomers of various type in a high energy radiation field.

The present invention is directed to the formation of graft copolymers by irradiating with gamma rays a mixture of an ethenically unsaturated monomer such as a vinyl monomer and a polymer of different composition. The graft copolymer may have the following generalized form:

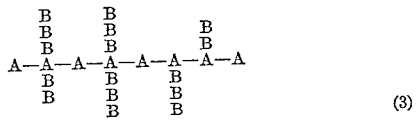  (3)

Here, the polymeric change derived from monomer B is grafted to various points along the linear chain of polymer A. A similar type of copolymer is the following:

  (4)

This type is sometimes referred to as a "block" copolymer, but we make no distinction herein, referring to both types as "graft copolymers." A molecule as (3) or (4) is, in a sense, a copolymer, as the two types of monomer groups are chemically found together in one polymer molecule. Because of the long sequences of A and B monomeric units, the mechanical and solution properties of such "grafted" copolymers are quite different from those of a copolymer such as (2) where the monomeric units are bound together in irregular sequence. In many respects, a "graft" polymer resembles a mechanical mixture of polymer A and polymer B, but the components cannot be separated chemically; for example, by extraction using a selective solvent for each of polymer A and polymer B, the graft copolymer is truly a chemical compound.

An object of this invention is the vulcanization of a natural or synthetic rubber by irradiation.

A further object of this invention is to provide an additive to natural or synthetic rubber thereby reducing the energetic radiation required to vulcanize natural or synthetic rubber.

Before proceeding to describe our invention further, it may be well to describe briefly the effects of high energy radiation such as gamma radiation on polymers and monomers polymerizable by such high energy radiation.

As is now generally understood, monomers are converted into polymers in the presence of high energy radiation fields through the formation of free radicals. The resulting free radical combines with other monomer molecules in a chain-like fashion to produce a polymeric free radical. The growing polymeric free radical terminates, depending on the polymerization conditions, to form a polymer $A_x$ where $x$ indicates the number of monomeric units integrated into the formed polymer $A_x$.

The effect of high energy radiation, such as gamma rays, on synthetic or natural organic polymers is likewise regarded as being initiated by free radicals. Some polymers, such as polyethylene, natural rubbers and polystyrene, crosslink in the presence of gamma fields. Other polymers, such as Teflon (polytetrafluoroethylene) and polymethacrylate degrade in a gamma field and form polymers of lower molecular-weight hydrocarbons and hydrogen and other gases.

Vulcanization is the industrial process which transforms rubber from a soft, sticky, readily molded plastic to the highly elastic material familiar to everyone for innumerable uses. It was discovered by Charles Goodyear in 1839 and involves simply the heating of rubber with sulphur. This process connects the linear polymers by crosslinkages of sulphur atoms. This type of bonding may be illustrated by the following diagram:

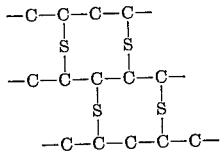

Many other ways are known for vulcanizing rubber without using any sulphur, but they are of relatively minor commercial importance. It is also known that some of the synthetic rubbers require unique systems for vulcanization. There is continuous, intensive chemical research activity to find some better way of vulcanizing natural and synthetic rubber.

The exact chemical mechanism for a series of reactions involved in chemical vulcanization systems is still very imperfectly known. They are usually considered to be free radical reactions. In general, there occur, besides crosslinking, side reactions and such things as cyclization and chain scission which can affect the quality of the product.

A probable mechanism of gamma ray vulcanization in the effectuation of crosslinked formations is the breaking of a C—H bond resulting in a hydrogen atom which abstracts another hydrogen atom from a neighboring molecule, forming a hydrogen molecule. The resultant two free carbon valances then unite to form a crosslink. It can be anticipated that vulcanizates containing direct carbon-to-carbon crosslinks will be inherently more stable than sulphur vulcanizates, since the energy of the C-to-C bond is 58.6 and that the polysulphide bond only 27.5 kilogram-calorie per mole, respectively.

It is known that in order to crosslink rubber effectively, between 10 and 50 megarads is needed to achieve the desired tensile strength, modulus and elongation measurement. The addition of the usual chemical vulcanizing agent, including sulphur, is not seen to have much effect on gamma ray vulcanization. Experiments in which well known free radical producing compounds such as organic disulphide, t-butyl hydroperoxide, etc., when added to the rubber produced, at most, only minor improvements in the gamma ray efficiency crosslinking. It is the teaching of this invention that in the presence of vinyl monomers such as 2,5-dichlorostyrene, 3,4-dichloro-1-vinyl cyclohexane and the systems of the three components, styrene-acrylonitrile-divinyl benzene, will increase the efficiency of radiation and thereby lower the dosage to about 1.1 megarads to effectuate vulcanization.

The following method in which parts and percentages are by weight is presented in order that the method of preparation as well as the product resulting from the method of our invention may be thoroughly understood and recognized. This method is not to be taken, however, as limiting the invention. Controlled experiments were also performed. The controlled ones consisted of irradiating the polymer in the absence of a monomer.

A latex, such as Hevea rubber pale crepe, was masticated on a rubber mill to uniform breakdown and manifested a viscosity average molecular weight of 244,000 using the relationship of Carter et al. (Carter, W. C., Scott, R. L. and Magat, M., Natural Rubber, Journal of the American Chemical Society, 68, 1480–1485, 1946). Prior to use, the rubber was shredded and extracted with acetone followed by drying in vacuo. Sheets of rubber were prepared in thick films (ca. 0.2 cm.) by pressure on a heated press or in thin films (ca. 0.005 cm.) by casting from benzene solution. Monomers, as set forth in Table I, were incorporated into the rubber films either by direct contact with liquid or by storage over vapors of monomer. In studies with thin films used for gel determination, the specimens were degassed and sealed in Pyrex ampules, while the thick films used for physical property measurements were generally mounted into an aluminum mold of the type described by Jackson and Hale (Vulcanization of Rubber with High Intensity Gamma Radiation, Rubber Age, 77, 865–871, 1955). Immediately prior to irradiation the specimens mounted in aluminum molds were heated for 30 to 60 seconds under steam of 55 p.s.i. gauge pressure at ca. 150° C. The specimens were exposed to gamma rays of approximately 0.8 mev. and 1.1 megarads per hour intensity from spent fuel elements.

Gel fraction determination of irradiated specimens were performed in two ways. Accurately weighed samples of about 0.4 g. were allowed to stand in 100 ml. benzene in the dark for 40 hours. Approximately 0.1 g. of hydroquinine was added to the benzene solvent to retard oxidation and polymerization of unreacted monomer. The contents were then filtered under moderate pressure on a 100-mesh Nichrome screen and the content of rubber in sol and gel determined by evaporation to constant weight. In the second procedure, which proved to be rapid and more suitable for several of the systems, the rubber was placed in chlorobenzene containing 0.1% phenyl-beta-naphthylamine at 132° C. for several hours under a nitrogen atmosphere.

The determination of composition of graft copolymers was performed by elemental analysis.

From the results obtained with 2,5-dichlorostyrene, as revealed by Table IA, it is evident that this compound has a profound effect toward reducing the dosage required to gel natural rubber and that the optimum concentration of monomer lies in the range of 15 to 21.3 weight percent. It is discernible from Table IB that in an initial concentration of about 15.6 weight percent of dichlorostyrene a dosage of 1.1 megarad is sufficient to gel virtually all network chains, while the non-grafted control requires a dose of 33.4 megarads to produce an equivalent degree of grafting.

A further effect of graft vulcanization was found in these inventions and is illustrated in Table IC. The presence of vinyl polymer serves to reduce the swelling index of vulcanizate below the value of the control. It is, therefore, obvious that there exists an infinite variety of monomer combinations and concentrations that can be studied.

Our invention can also be applied to synthetic rubbers such as neoprene and GR–S rubbers.

A fundamental point that arises concerns the mechanism whereby the various monomers listed in Tabel I reduce the dose level for gelation (weight of gel swollen in benzene at 25° C. for 48 hours divided by dry weight of elastomer). One main contribution of the halogen containing vinyl monomers is their increased radiation sensitizing action when incorporated in rubber. This effect is indicated in Table IC upon comparing the gel content of runs made with 2,5-dichlorostyrene and 3,4-dichloro-1-vinyl cyclohexane with the control and p-chlorostyrene. However, radiation sensitization by added reagent does not describe the entire effect, since the non-monomeric liquid p-dichlorobenzene produces a result intermediate to the control and the chlorine containing monomers.

It is postulated that the increase in efficiency of radiation vulcanization is attributed to several factors which include transfer of radical sites to alpha-methylenic groups in the rubber as well as infrequent addition of growing polymer radicals to doubel bonds in rubber.

It is concluded from this invention that the method of simultaneous radiation vulcanization and grafting not only serves to minimize the dose required to effect gelation of network chains but also enables the preparation of vulcanizates having a broad range of mechanical and chemical properties.

It is further concluded that a rubber graft copolymer is formed, rather than a mixture of vulcanized rubber and polymerized monomer, by the much lower dose required to effect gelation when the monomer is present. At 6 megarad dosage, only 41.7% of rubber chains are gelled, but in the presence of monomer; e.g., dichlorostyrene, the entire system (96.1%) is gelled. Since neither the monomer nor the rubber alone could give this high gel content it is, therefore, concluded that they have interacted to give a vulcanized graft copolymer.

Since many embodiments may be made of the present invention and since any changes might be made in the embodiment described, it is to be understood that the foregoing description is to be interpreted as illustrative only and not in a limiting sense.

TABLE I

*Simultaneous Vulcanization of Natural Rubber and Graft Copolymerization With Vinyl Monomers*

TABLE IA.—EFFECT OF MONOMER CONCENTRATION

| Added monomer | Wt. percent monomer | Temp.[a] (° C.) | Dose (mrad) | Gel content [b] (wt. percent) |
|---|---|---|---|---|
| Control | 0 | 29.1 | 1.1 | 16.3 |
| 2,5-dichlorostyrene | 3.6 | 30.3 | 1.1 | 24.0 |
| Do | 8.1 | 32.0 | 1.1 | 86.1 |
| Do | 15.6 | 56.4 | 1.1 | 98.1 |
| Do | 21.3 | 59.1 | 1.1 | 97.6 |
| Do | 69.8 | 70.4 | 1.1 | 14.8 |

[b] See footnotes at end of Table IC.

TABLE IB.—EFFECT OF TOTAL DOSE

| Control | 0 | 29.1 | 1.1 | 16.3 |
|---|---|---|---|---|
| Do | 0 | 29.1 | 33.4 | 96.9 |
| 2,5-dichlorostyrene | 15.6 | 38.2 | 0.2 | 9.4 |
| Do | 15.6 | 49.9 | 0.5 | 59.6 |
| Do | 15.6 | 56.4 | 1.1 | 97.6 |
| Do | 15.6 | 48.9 | 5.3 | 98.0 |

TABLE IC.—EFFECT OF MONOMER STRUCTURE

| Added Monomer | Wt. percent monomer | Temp.[a] (° C.) | Dose (mrad) | Gel content [b] (wt. percent) | Tensile stgth. (p.s.i.) | Elongation (percent) | Swelling ratio [c] |
|---|---|---|---|---|---|---|---|
| Control | 0 | S.T. | 36.0 | 97.8 | 1,260 | 540 | 5.9 |
| Do | 0 | S.T. | 6.0 | 41.7 | | | |
| 2,5-dichlorostyrene | 15.6 | S.T. | 6.0 | 96.1 | 1,490 | 455 | 4.3 |
| Styrene+divinyl benzene (96/4 vol.) | 15.7 | S.T. | 6.0 | 83.2 | 2,100 | 190 | 4.6 |
| Styrene+acrylonitrile (60/40 vol.) | 14.1 | S.T. | 6.0 | 98.9 | 2,240 | 260 | 2.7 |
| p-Chlorostyrene | 15.8 | S.T. | 6.0 | 81.8 | | | |
| 3,4-dichloro-1-vinyl cyclohexane | 14.3 | S.T. | 6.0 | 93.4 | 2,380 | 180 | 3.7 |
| Styrene+acrylonitrile+divinyl benzene (58/40/2 vol.) | 15.2 | S.T. | 6.0 | 96.2 | 3,740 | 205 | 1.8 |
| p-Dichlorobenzene | 12.9 | S.T. | 6.0 | 68.7 | | | |

[a] Upon repeating several of the earlier runs performed at 1.1 mrad per hour gamma-ray intensity, it was found that heating of samples occurs during irradiation. The values given represent the average temperature recorded with thermocouples throughout each run. Where the symbol S.T. is used, the specimens were held at approximately a source temperature of 29° C.
[b] Calculated for total polymer present; i.e., rubber plus polymerized monomer.
[c] Defined as weight of gel swollen benzene at 25° C. for 48 hours divided by dry weight of elastomer.

We claim:
1. A method of vulcanizing rubber latex comprising exposing a mixture containing latex and from about 15 to about 21.3 weight precent of 2,5 dichlorostyrene to about 1.1 megarads of gamma ray irradiation at a temperature ranging from about 56° C. to about 59° C. during said exposure.

2. A method of vulcanizing Hevea rubber latex comprising exposing a mixture containing Hevea rubber latex having a molecular weight of about 244,000 and from about 15 to about 21.3 weight percent of 2,5 dichlorostyrene to about 1.1 megarads of gamma irradiation while maintaining the temperature of the mixture at a temperature ranging from about 56° C. to about 59° C. during said exposure.

References Cited in the file of this patent
UNITED STATES PATENTS
2,956,899    Cline  ---------------- Oct. 18, 1960
FOREIGN PATENTS
546,817    Belgium  --------------- Oct. 6, 1956
OTHER REFERENCES
Lawton et al.: Nature, volume 172 (July 11, 1953), pages 76 and 77.
BNL 414, October 1956, page 9.